May 20, 1952

E. D. PHINNEY ET AL

SUPERHETERODYNE RADIO RECEIVER
EMPLOYING A MULTIFUNCTION TUBE 2,597,029

Filed Sept. 21, 1946

3 Sheets-Sheet 1

INVENTORS
EDWARD D. PHINNEY
ALEC H. REEVES

BY E D Phinney

ATTORNEY

May 20, 1952 E. D. PHINNEY ET AL 2,597,029

SUPERHETERODYNE RADIO RECEIVER
EMPLOYING A MULTIFUNCTION TUBE

Filed Sept. 21, 1946 3 Sheets-Sheet 2

INVENTORS
EDWARD D. PHINNEY
ALEC H. REEVES
BY E. D. Phinney
ATTORNEY

INVENTORS
EDWARD D. PHINNEY
ALEC H. REEVES
BY E. D. Phinney
ATTORNEY

Patented May 20, 1952 2,597,029

UNITED STATES PATENT OFFICE 2,597,029

SUPERHETERODYNE RADIO RECEIVER EMPLOYING A MULTIFUNCTION TUBE

Edward D. Phinney, Mount Vernon, N. Y., and Alec Harley Reeves, Reigate, England, assignors to International Standard Electric Corporation, New York, N. Y., a corporation of Delaware Application September 21, 1946, Serial No. 698,484

15 Claims. (Cl. 250—20)

This invention relates to electrical wave translation circuits and pertains more particularly to radio amplifiers and radio receivers.

Radio circuits have been known for some time in which one vacuum tube or a series of tubes performs simultaneously a plurality of functions, such as amplifying and detecting a wave of a single frequency or amplifying at the same time several waves of different frequencies. Examples of such circuits are the well known regenerative and reflex circuits.

An object of the invention is to perform two or more operations in a single device successively and repeatedly in a simple, economic and efficient manner.

Another object is to produce a radio circuit wherein a translation device such as a vacuum tube or a group of vacuum tubes and their associated circuits, carries out a plurality of separate operations or functions successively whereby the number of circuit elements required is greatly reduced. For example, one vacuum tube performs successively at a high rate of speed several different operations that ordinarily would be performed simultaneously by several different tubes. These operations may include amplifying high or intermediate frequencies, detecting, and amplifying audio frequencies.

Another object is to reduce the number of tubes required for a radio receiver.

Another object is to increase the amplification of a given amplifier circuit.

Another object is to detect or mix and/or amplify electrical waves in a single electron discharge device successively and repeatedly at a super audible rate.

Further, objects of this invention will appear in the description which follows.

In carrying out these various functions successively advantage is taken of the pulse transmission principle according to which, as is well known, a wave of any frequency may be reproduced by selecting a plurality of spaced points or sections, i. e. pulses of the wave, amplifying, or otherwise treating the pulses, and then creating from the resulting pulses a signal wave. In the audio frequency range the sounds may satisfactorily reproduced from pulses representing three points per cycle of the highest frequency it is desired to reproduce.

Thus, this invention involves a circuit comprising a single translating device through which a selected pulse or portion of a signal may be recycled at least once, successively and non-currently, from the output of the device through a delay network to the input of said device whereby said pulse may be translated and withdrawn; and then repeating said operation (preferably at a comparatively high rate), with a newly selected pulse. By recycling is to be understood the feeding of the output signal from the translating device back to the input thereof, whereby said translating device is enabled further to act on the said output signal.

A better understanding of the above objects and features of this invention may be had by referring to the following detailed description and accompanying drawings of specific embodiments in which.

Figure 1:
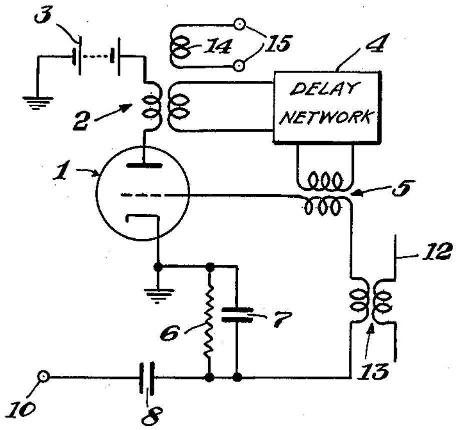
Figure 1 is a schematic wiring diagram of an amplifier circuit embodying this invention.
Figure 2:
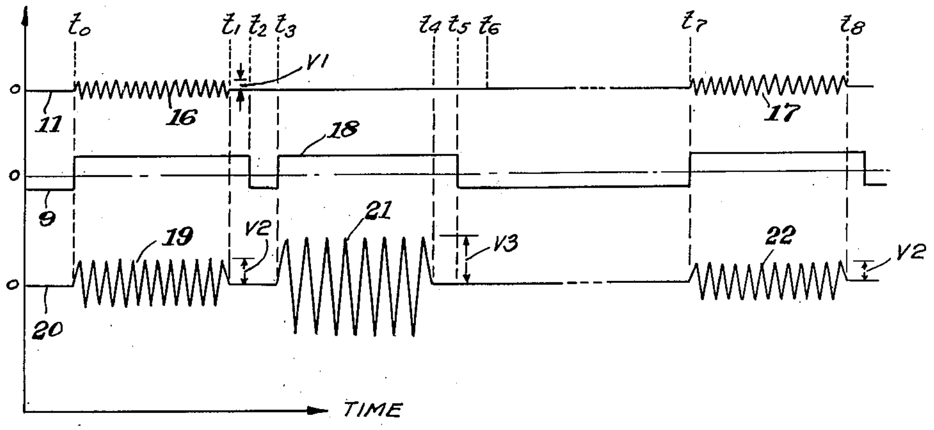
Figure 2 is a graph of waveforms useful in explaining the operation of the circuit in Figure 1.

Referring to Fig. 1, 1 is a triode containing output transformer 2 connected to a high tension power supply or B+ battery 3. The secondary winding of 2 is connected through delay network 4 to the grid transformer 5. The grid circuit is completed through windings of transformers 5 and 13, and is connected to the cathode through resistor 6 shunted by condenser 7. Condenser 8 enables a local control wave 9 (shown in Fig. 2) to be applied to the grid of tube 1 from terminal 10.

If the circuit is to be used as a high frequency amplifier, the signal input wave 11 (shown in Fig. 2) may be introduced at antenna 12 coupled to the grid transformer 13. Transformers 2, 5 and 13 and also delay network 4 are arranged to pass the desired signal high frequency, as is also the output winding 14 coupled to transformer 2 and connected to output terminals 15.

Assume first, in order to describe the operation of this circuit, that the input signal wave 11 consists of successive trains of high frequency oscillations such as 16 and 17, which will be "on" from $t_0$ to $t_1$, "off" from $t_1$ to $t_7$, and then "on" again from $t_7$ to $t_8$, etc. The control wave 9 is applied at terminal 10 simultaneously with the input signal wave at time $t_0$, and the control wave becomes suddenly positive, making the valve 1 conductive as a class A amplifier. Conductivity lasts until time $t_2$ which is slightly in excess of time $t_1$. After the small gap $t_2$ to $t_3$ (which may be zero, if desired) the valve 1 again becomes conductive due to portion 18 of the control wave 9, and is again blocked at time $t_5$, slightly in excess of time $t_4$ ($t_3$ to $t_4$ being equal in time to $t_0$ to $t_1$).

Between $t_0$ the valve or tube 1, being conductive, will amplify the input signal 16, thus giving an amplified signal or train 19. Signal 19 is thus the same as 16, but has the voltage increased by the amplification factor of the valve 1 under the given conditions, i. e. from V1 to V2. The time constant of delay network 4 is arranged to be equal to the time $t_0$ to $t_3$. Thus, if delay network 4 has no attenuation, the amplitude V2 of 19 will appear at the grid of valve 1 during the time $t_3$ to $t_4$. In this way it will be amplified again by the factor of valve 1 giving an output wave 21 of voltage V3.

Now the valve 1 is not conductive again until time $t_7$, at which time the second wave train 21 of voltage V3 has completely passed through delay network 4 and died away. At the instant $t_7$ therefore, the only voltage at the grid of valve 1 will be the second train 17 of the signal wave 11, which will appear in the output of the amplifier as the voltage V2 of portion 22 and will last until time $t_8$, whereupon it is returned to the grid of valve 1 through the delay network 4 for further amplification as explained hereinafter in conjunction with signal input or train 16.

Voltage V3 therefore will be equivalent to two stages of amplification of the valve 1. This twice amplified voltage may be extracted at terminals 15 either alone or together with the smaller voltage V2, as desired.

It is not necessary for the signal input wave 11 itself to be pulsed as shown so long as this input is present between the times $t_3$ and $t_4$, $t_7$ and $t_8$, etc. If it is continuous the only effect will be a slight increase in the voltage V3 without affecting the stability of the circuit.

If the delay network 4 is terminated perfectly by transformers 2 and 5, there will be no reflections. If, however, the termination is imperfect and there is a reflection component of N db (decibels) returning to the transformer 2 after the time $t_4$, the circuit will be unstable for an amplification factor of valve 1 greater than $$\frac{N}{2}db$$

In such a case, to achieve stability the time interval between $t_5$ and $t_7$ must be greater than three or more periods, each equal to the delay time of the network 4. If, for example, it is slightly greater than three times the delay or time constant of network 4, it will only be the second reflection and not the first which can cause instability. This second reflection in general can be arranged to be considerably more db down than the amplification factor of valve 1. (Alternatively, if time $t_3$ to $t_7$=5 times the delay of network 4, the second reflection too will be cut off by valve 1.) In the case just explained the time $t_3$ to $t_4$ must be ⅕ of the time $t_0$ to $t_7$. The average amplified energy in the output circuit is thus:

$$e\left(\frac{A}{5}+\frac{A^2}{5}\right)=\frac{e}{5}(A+A^2)$$

where "e" is the input amplitude and A is the energy amplification per stage. If, for example, "A"=1000, this comes to approximately 200,000 which is approximately 200 times that of an ordinary single stage amplifier.

If desired, the same principle can be used for a larger effective number of amplifications than two, all in the same tube 1.

If the circuit comprising 2, 4 and 5 has the characteristics of a filter (e. g. band-pass filter) at the signal frequency, the over-all frequency characteristic will be that of M stages of such a filter, if the amplification is carried out M times. The signal frequency, of course, must be such that one period of it is small compared to the time delay of the network 4, and the pass band of the transformers and delay network must be wide enough to pass the pulsed envelope of the signal, i. e. wave 9 in Figure 2.

Figure 3:
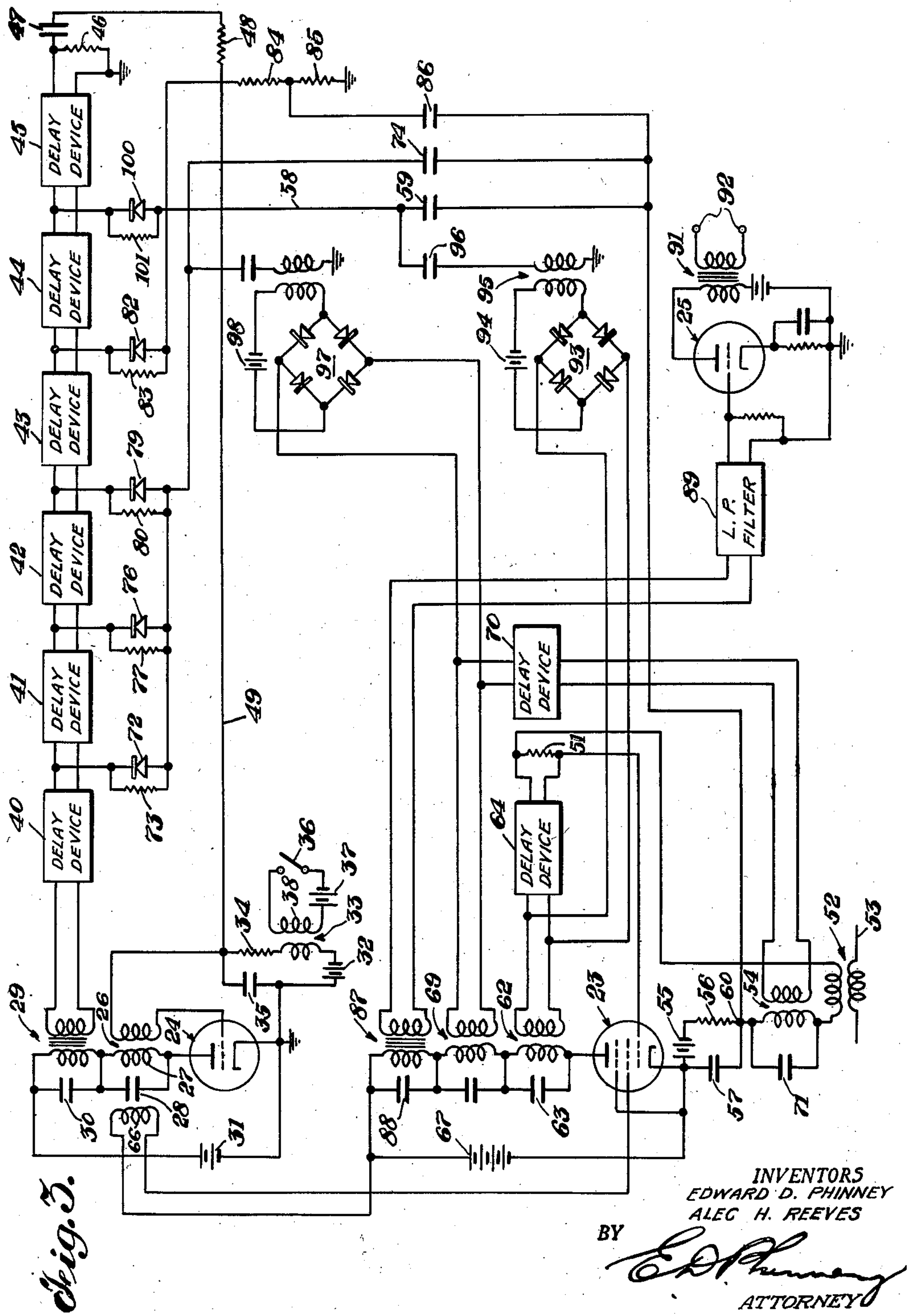
Figure 3 is a schematic wiring diagram of a radio receiver circuit embodying this invention.
Figure 4:
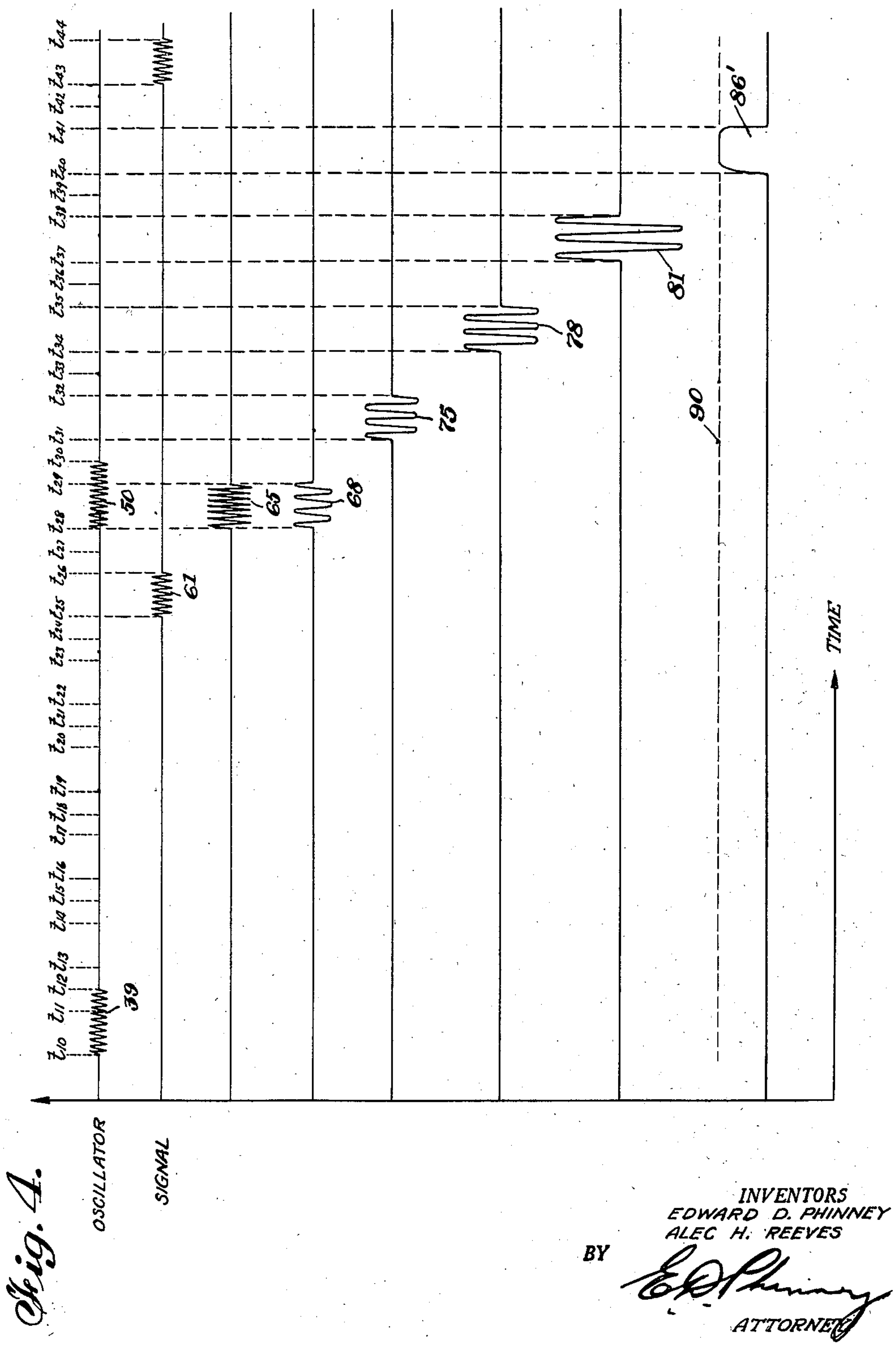
Figure 4 is a graph of waveforms useful in explaining the operation of the circuit in Figure 3.

The application of the above circuit in a superheterodyne receiver is shown in Fig. 3, wherein the valve 23 performs all the functions of a high frequency amplifier, mixer, three stages of I. F. amplification, and a second detector. Valve 24 is the beating oscillator. The low frequency amplifier stage is shown as the separate valve 25 (but this also may be combined with the functions of 23 if the full average output of 23 is not required). Tube or valve 24 may be a triode oscillator operating by means of transformer 26, of which the primary winding 27 is shunted by condenser 28. The anode circuit is completed through pulse transformer 29 at which the high frequency component is shunted by condenser 30, and then connected to a high tension power source or B+ battery 31. By means of battery 32, connected through transformer 33 and resistor 34 (shunted by condenser 35), a negative bias is applied to tube 24 sufficient to prevent its oscillation. The constants are arranged so that if a positive pulse is applied externally to the grid of tube 24 (e. g. by means of the key 36, battery 37 and secondary winding 38 of transformer 33) the circuit will give a short train of oscillations 39 (see Fig. 4) at the beating oscillator frequency, irrespective of the duration of the applied positive pulse which occurs at the time $t_{10}$ (Fig. 4). Resistance 34 and condenser 35, so chosen as to constitute, in conjunction with high frequency transformer 26, a blocking or squigging circuit of a type well known in the art, will cause a negative charge to accumulate on the grid by grid current, sufficient to quench the oscillation after a predetermined very short time interval, say, at $t_{12}$. By suitable choice of the constants of transformer 29, and of the input impedance of delay network section 40, such a single train of oscillations is arranged to cause a single positive pulse in the secondary of transformer 29 of duration substantially equal to that of the train of high frequency oscillations 39. This pulse is due to the change in plate current of 24 when oscillating, and condenser 30 prevents the high frequency components from reaching 29. Transformer 29 is connected to six equal sections 40, 41, 42, 43, 44 and 45 of a delay network passing the main pulse components. On arrival at the output of delay device 45 of the network, which is terminated by resistor 46 and condenser 47, the output positive pulse is applied through decoupling resistance 48 back to the grid of 24 through line 49 and the secondary of transformer 26. When the pulse strikes the grid of tube 24, the voltage resulting is arranged to be sufficient to cause another train of oscillations 50 (see Fig. 4) similar to 39, thus causing a second pulse at 29 which will again pass through the delay devices or network 40 through 45. The sequence of events will thus be repeated indefinitely; the oscillator being operative for a short period $t_{10}$ to $t_{12}$ in each cycle followed by a period of quiescence from $t_{12}$ to $t_{28}$ (see Fig. 4). The circuit constants may be chosen so that each oscillator train lasts for a time $t_{10}$ to $t_{12}$, slightly shorter than the delay time $t_{10}$ to $t_{13}$ or $t_{13}$ to $t_{16}$, etc. of each of the delay sections 40 through 45.

The grid circuit of valve 23 is completed through resistor 51, antenna input transformer 52 (to antenna 53), transformer 54 and bias such as battery 55 via resistor 56. The battery 55 and resistor 56 are shunted by condenser 57, and the voltage of 55 is such that the plate current of 23 is normally just cut off completely.

Starting from this condition, the key 36 is momentarily closed, and re-opened at time $t_{10}$. The windings of transformer 33 are so poled that the starting transient voltage, generated in the secondary or grid winding when closing key 36 allows current from battery 37 to flow in the primary winding 38, merely makes the grid of tube 24 slightly more negative, and the tube accordingly remains inactive. When the key is re-opened, however, the abrupt cessation of current flow in the primary winding sets up in the secondary winding a transient voltage much larger than the previous transient, and of reverse sense, making the grid of tube 24 sufficiently positive to enable the tube to start oscillating, trains of oscillations being generated as described in connection with Fig. 1. Following the opening of the key at time $t_{10}$, therefore, tube 24 delivers a train of oscillations 39, Fig. 4, together with a D. C. pulse at the input of delay device 40, this pulse being positive to ground and resulting from the envelope of the train of oscillations 39. When this pulse arrives at the output of delay device 44, a certain fraction of the pulse energy will pass through line 58 and condenser 59 to the junction 60 between 56 and 54. Condenser 57 is a shunt for the high frequency components only and will not short circuit the positive or D. C. pulse components to ground. There will thus be a sudden rise of potential of the grid of 23. This value is arranged to be just sufficient to overcome the bias of 55 and cause 23 to be a class A amplifier. If the input signal 61 (shown in Fig. 4) is present at this moment at antenna 53, it will be amplified in tube 23, and the output selected by the tuned primary inductance of transformer 62 together with condenser 63 is applied through delay device 64, across resistor 51, thus getting back to the grid of tube 23. Delay device 64 has a time delay equal to $t_{10}$ to $t_{12}$, same as that of each device 40 through 45, and has frequency characteristics (e. g. band-pass) passing the desired signal high frequency components.

By the time signal 61 is amplified and is delayed (shown at 65 in Fig. 4) and arrives back on to the grid of tube 23, the D. C. pulse from the envelope of 39 enabling this amplification to take place, will have passed from the output of delay device 44 to the output of delay device 45. At this moment, as explained above, valve 24 will give a burst of oscillations 50 at the beating oscillation frequency, of duration slightly less than the delay time $t_{28}$ to $t_{31}$ of each of the devices 40 through 45. By means of the extra winding 66 to transformer 26, some of this beating oscillator train is applied between the screen grid of tube 23 and battery 67. This beating oscillator voltage on the screen is arranged to be sufficient to overcome the bias of battery 55, enabling tube 23 to act as a mixer and detector during time $t_{28}$ to $t_{30}$. The resulting intermediate frequency train 68 (in Fig. 4), of frequency such that a sufficient number of cycles of the intermediate frequency are contained in the time corresponding to the delay in one section of the delay devices 40 through 45, is applied through transformer 69 to delay device 70 (equal to that of each of the other delay devices) and from there through transformer 54 back to the grid of tube 23. (Condenser 71 is arranged to shunt the radio frequency signal components only, and not the intermediate frequencies of 68. It can with advantage be made to tune the secondary winding of transformer 54 to the intermediate frequency.)

By the time oscillations 68 arrive at transformer 54 and pass once more on to the grid of tube 23, the beating oscillator 24 has ceased to function; but at this moment a positive D. C. pulse will appear at the output of delay device 40 and thence via the rectifier-resistor combination 72—73 and condenser 74, on to the junction 60. This positive pulse also is arranged to overcome the bias of battery 55, causing tube 23 again to be a class A amplifier. The resulting amplified I. F. wave 75 (Fig. 4) will again appear at 69 and once more be applied to delay device 70. This delay device 70 must have frequency characteristics passing the I. F. components.

By the time that the amplified I. F. wave 75 has again reached transformer 54, the original D. C. pulse from 29 will have reached the output of delay device 41. From device 41 a portion of this pulse energy may be similarly applied via rectifier-resistor combination 76—77 and condenser 74 in such a way as again to cause a momentary reduction to zero of the negative bias of tube 23 producing further amplified I. F. wave 78 (see Fig. 4).

The operation described above occurs a third time, when the twice amplified I. F. train 78 again reaches transformer 54 and when the D. C. pulses from 29 have reached the output of delay device 42. By means of rectifier-resistor 79—80 a fraction of the pulse power is again applied to condenser 74 and once more reduces the bias of tube 23 to produce a still further amplified I. F. wave 81 (see Fig. 4).

After three stages of amplification at the intermediate frequency (see 75, 78 and 81) in this way, the D. C. pulse from 29 will have reached the output of delay device 43. On this occasion a fraction of the D. C. pulse power is again applied via rectifier-resistor 82—83, resistor network 84 and 85, and condenser 86 to the grid of tube 23. A tapping on 84—85 produces a lower value of positive increase for the bias of tube 23, but is sufficient to cause tube 23 to act as an anode-bend second detector or rectifier to the thrice amplified I. F. train or wave 81 which then arrives at its grid. The resulting increase of plate current in tube 23 produces a D. C. pulse 86′ (see Fig. 4) in the secondary winding of the low frequency transformer 87; condenser 88 shunting the I. F. This pulse 86′ may then be passed via low pass filter 89 to the grid of a low frequency amplifier tube 25; filter 89 passing the desired audio components only (see wave 90 in Fig. 4). The final audio output may be obtained via transformer 91 on terminals 92.

If desired, transformer 87 may be constructed to pass energy from each wave (shown in Fig. 4) that passes from the anode of tube 23 or only that from the wave 86′ by means of a suitable blocking circuit (not shown). Passage of energy from each wave may be of advantage when the I. F. gain at each successive amplification by tube 23 is small, in which it is of advantage to use for the second detection the total amplified energy in the I. F. trains and not merely the energy in the final output train.

One or more of the delay devices may be adjusted or varied at will to cause one or more of the recycled pulses to overlap with each other in time, either wholly or partially, to vary the gain of the circuit. If desired, the tube 23 may be biased so that energy passes through it only when two or more recycled sections or pulses of energy overlap in time and add to each other. Thus, by employing variable time-constant circuits in one or more of the delay devices to vary the amount of overlap of such pulses, a variable gain control is obtained.

To ensure stability, it is necessary that certain of the above functions of the circuit be suppressed while the particular function desired at any moment is taking place. For this purpose, one diagonal of the rectifier bridge 93 may be connected across the input of delay device 64, and battery 94 connected across the other diagonal of the bridge via pulse transformer 95 to cause the bridge to short circuit the input to delay device 64 in the absence of voltage across transformer 95. By means of a condenser 96, however, at the required moment in the sequence that it is desired to pass signal through delay device 64, the pulse on the output of delay device 44 may be arranged to oppose throughout the whole of its duration, the voltage of battery 94, thus opening the diagonal of the bridge 93 concerned, enabling signal 81 to pass to device 64. At all other moments the delay device 64 has its input short circuited. Similarly, one diagonal of the rectifier bridge 97 may be connected across the input of delay device 70, short circuiting the latter due to the action of the battery 98, except at the desired interval for the operation of delay device 70, i. e. at the moment of arrival of D. C. pulses at the outputs of delay devices 40, 41 or 42.

To prevent the pulses from the various tappings on the delay network 40 through 45 from getting back from one section to another, thus causing undesired interaction, the rectifiers 72, 76, 79, 82 and 100 are inserted and shunted respectively by resistances 73, 77, 80, 83 and 101. Each rectifier-resistor combination thus has low resistance to positive pulses from the filter section to the desired output point, but a high resistance in the reverse sense.

In addition to the provision of the stabilising bridges 93 and 97, further protection may be secured by increasing the delay of delay network 44, preferably to an integral multiple of the delay of any one of the other sections. This further stabilisation may be necessary in certain cases to ensure that any undesired reflections around the intermediate frequency delay device 70 have died away sufficiently before the next cycle of operations is commenced.

Thus, a superheterodyne receiver has been obtained wherein all the amplification and detection both at high and intermediate frequencies is due to a single device such as tube 23.

While the invention has been described in particular detail and preferred forms illustrated, it is to be understood that it is not limited thereto. It is further to be understood that many other modifications, adaptations, omissions, and additions may be made without departing from the scope of the invention as defined in the appended claims. In particular, the invention may be adapted to detection, amplification, frequency changing and other such processing of signals other than speech modulated signals, for example telegraph, teleprinter, facsimile, radar and the like signals, and also to frequency multiplying in dividing systems.

What is claimed is:

1. A radio translator comprising a single amplifier stage, means for repeatedly amplifying a signal of a given frequency in said stage, means for varying the conditioning of said stage for detection and amplification at a lower frequency, and means for repeatedly amplifying said lower frequency signal in said stage.

2. A radio receiving circuit comprising an electron discharge tube, a source of local oscillations of a first frequency and means for successively conditioning said tube to perform separately: reception of pulse waves of a second frequency, beating of said first and second frequency to produce waves of a third frequency, amplification of said waves of said third frequency, and detection of said waves of said third frequency.

3. A radio receiver comprising means for receiving a radio frequency wave, an amplifying electron discharge tube, means to provide a pulse of said received radio frequency at the input of said tube, means for coupling the output of said tube through a delay means to the input whereby said radio frequency pulse is amplified, means subsequently operative for varying the operating characteristics of said tube for detection to produce a detected pulse, means for coupling said detected pulse from the output of said tube to its input through a delay means whereby a repeated amplification of said detected pulse is obtained, means for subsequently producing an output signal pulse, and means for restoring the radio receiving means to its initial condition, whereby the cycle of reception and operation may be repeated.

4. An amplifier circuit comprising an electron discharge tube, means for selecting and separating from a signal wave time-spaced portions thereof while rejecting intermediately timed portions, and means for recycling each of said selected portions of said signal wave through said tube in a plurality of successive time separated operations before repeating said recycling with a newly selected portion of said signal.

5. An electric signalling apparatus comprising an input and output circuit, a feedback circuit coupling said input and output circuits, means for applying a signal wave to said input circuit, a translating device coupled to said input circuit, and means for successively conditioning said translating device to perform heterodyning and amplifying on said signal wave in a plurality of separate different actions performed successively at a super-audible rate as said wave passes through said device.

6. A system comprising a translating device, means for applying signal energy to said device, means for biasing said device to pass said energy therethrough while performing a given function thereon to alter the characteristics of the passed energy, means for varying said bias to pass the altered energy therethrough while performing a different function on said altered energy to further alter the characteristics thereof, and means for controlling said device cyclically to perform each of said functions at least twice in time-spaced operations on said signal energy before performing the next function thereon.

7. A system according to claim 6 wherein said energy is in the form of pulses and said controlling means includes a feedback path between the output and input of said device, and delay means in said path having a delay value greater than the duration of each pulse.

8. A system according to claim 6 wherein said device is an amplifier.

9. A system according to claim 6 wherein said device is a single electron discharge tube.

10. A system according to claim 6 wherein the biasing means includes further including means for biassing said tube to operate as an amplifier, and means for varying the biassing of said tube to cause it to operate as a detector.

11. A radio circuit comprising an electron discharge device having an input circuit and an output circuit, means for applying to said input circuit pulse modulated signals having a given repetition frequency, a feedback path from said output circuit to said input circuit, a delay device in said feedback path having a delay period greater than the duration of the pulses of said signals and means for causing said discharge device to operate successively and non-concurrently as amplifier and detector in the interval between the reception of successive signal pulses.

12. A radio circuit for reception of signals consisting of a series of separate pulses having a certain average recurrence rate comprising an electron discharge device having an input circuit and an output circuit, a feedback path from said output circuit to said input circuit and means for causing said discharge device to act successively and non-concurrently as amplifier and as detector in the interval between the reception of one input pulse and the reception of the next input pulse.

13. A radio circuit for reception of signals consisting of a series of separate pulses having a certain average recurrence rate comprising an electron discharge device having an input circuit and an output circuit, a feedback path from said output circuit to said input circuit and means for causing said discharge device to act successively and non-concurrently as amplifier, detector and amplifier in the interval between the reception of one input pulse and the reception of the next input pulse.

14. A radio circuit comprising an electron discharge device having a control grid and an input circuit and an output circuit, means for applying to said input circuit pulse modulated signals having a given repetition frequency, a feedback path from said output circuit to said input circuit, means for applying a biassing potential to said control grid to condition said device to perform different operations, and means for cyclically changing the said biassing potential to cause said discharge device to operate successively and non-concurrently as amplifier and detector in the interval between the reception of successive signal pulses.

15. A radio circuit comprising an electron discharge device having an input circuit and an output circuit, means for applying to said input circuit pulse modulated signals having a given repetition frequency, a feedback path from said output circuit to said input circuit, a delay device in said feedback path having a delay period greater than the duration of the pulses of said signals and means for causing said discharge device to operate successively and non-concurrently as oscillator and mixer in the interval between the reception of successive signal pulses.

EDWARD D. PHINNEY.
ALEC HARLEY REEVES.

REFERENCES CITED

The following references are of record in the file of this patent:

UNITED STATES PATENTS

| Number | Name | Date |
|---|---|---|
| 1,733,614 | Morrison | Oct. 29, 1929 |
| 2,005,789 | Koch | June 25, 1935 |
| 2,022,085 | Johnson | Nov. 26, 1935 |
| 2,045,224 | Gerhard | June 23, 1936 |
| 2,058,512 | Rust | Oct. 27, 1936 |
| 2,077,597 | Van Gogh | Apr. 20, 1937 |
| 2,158,285 | Koch | May 16, 1939 |
| 2,221,666 | Wilson | Nov. 12, 1940 |
| 2,251,397 | Case | Aug. 5, 1941 |
| 2,300,632 | Poch | Nov. 3, 1942 |
| 2,310,692 | Hansell | Feb. 9, 1943 |
| 2,407,394 | Birr | Sept. 10, 1946 |
| 2,416,328 | Labin | Feb. 25, 1947 |
| 2,419,570 | Labin | Apr. 29, 1947 |